United States Patent
Sites

(10) Patent No.: US 8,468,011 B1
(45) Date of Patent: Jun. 18, 2013

(54) DETECTING WRITING SYSTEMS AND LANGUAGES

(75) Inventor: Richard L. Sites, Menlo Park, CA (US)

(73) Assignee: Google Inc., Mountain View, CA (US)

(*) Notice: Subject to any disclaimer, the term of this patent is extended or adjusted under 35 U.S.C. 154(b) by 947 days.

(21) Appl. No.: 12/479,564

(22) Filed: Jun. 5, 2009

(51) Int. Cl.
G06F 17/28 (2006.01)
G06F 17/20 (2006.01)
G06F 17/27 (2006.01)

(52) U.S. Cl.
USPC ............... 704/8; 704/2; 704/3; 704/4; 704/5; 704/6; 704/7; 704/9

(58) Field of Classification Search
USPC .......................... 704/2–9; 715/256, 264, 265
See application file for complete search history.

(56) References Cited

U.S. PATENT DOCUMENTS

| | | | |
|---|---|---|---|
| 5,377,280 A | 12/1994 | Nakayama | |
| 5,425,110 A | 6/1995 | Spitz | |
| 5,490,061 A | 2/1996 | Tolin et al. | |
| 5,548,507 A | 8/1996 | Martino et al. | |
| 5,873,056 A | 2/1999 | Liddy et al. | |
| 5,913,185 A * | 6/1999 | Martino et al. | 704/8 |
| 6,047,251 A * | 4/2000 | Pon et al. | 704/1 |
| 6,081,774 A | 6/2000 | de Hita et al. | |
| 6,157,905 A * | 12/2000 | Powell | 704/2 |
| 6,167,369 A * | 12/2000 | Schulze | 704/9 |
| 6,167,398 A | 12/2000 | Wyard et al. | |
| 6,216,102 B1 | 4/2001 | Martino et al. | |
| 6,272,456 B1 * | 8/2001 | de Campos | 704/8 |
| 6,275,789 B1 | 8/2001 | Moser et al. | |
| 6,292,772 B1 | 9/2001 | Kantrowitz | |
| 6,704,698 B1 * | 3/2004 | Paulsen et al. | 704/1 |
| 7,020,338 B1 | 3/2006 | Cumbee | |
| 7,027,974 B1 | 4/2006 | Busch et al. | |
| 7,035,801 B2 * | 4/2006 | Jimenez-Feltstrom | 704/255 |
| 7,139,697 B2 * | 11/2006 | Hakkinen et al. | 704/9 |
| 7,191,116 B2 * | 3/2007 | Alpha | 704/8 |
| 7,359,851 B2 | 4/2008 | Tong et al. | |
| 7,523,102 B2 | 4/2009 | Bjarnestam et al. | |
| 7,552,045 B2 * | 6/2009 | Barliga et al. | 704/8 |
| 7,689,409 B2 * | 3/2010 | Heinecke | 704/9 |
| 7,818,165 B2 * | 10/2010 | Carlgren et al. | 704/8 |
| 7,865,355 B2 * | 1/2011 | Xu et al. | 704/8 |
| 7,979,266 B2 * | 7/2011 | Alpha | 704/8 |
| 8,027,832 B2 * | 9/2011 | Ramsey et al. | 704/9 |
| 8,224,641 B2 * | 7/2012 | Goswami | 704/8 |

(Continued)

OTHER PUBLICATIONS

B. Martins and MJ Silva. Language identification in web pages. In SAC'05: Proceedings of the 2005 ACM symposium on Applied computing, pp. 764-768, New York, NY, USA, 2005. ACM Press.*

(Continued)

*Primary Examiner* — Paras D Shah
(74) *Attorney, Agent, or Firm* — Remarck Law Group PLC

(57) ABSTRACT

Methods, systems, and apparatus, including computer program products, for detecting writing systems and languages are disclosed. In one implementation, a method is provided. The method includes receiving text; identifying portions of the text as being non-repetitive, the identifying including: compressing underlying data of a first portion of the text, identifying a data compression ratio based on the amount of compression of the underlying data, and determining whether the first portion of the text is non-repetitive based on the data compression ratio; and identifying the first portion of the text as candidate text for use in language detection based on the portions of the text that are determined to be non-repetitive.

5 Claims, 10 Drawing Sheets

U.S. PATENT DOCUMENTS

| | | | | |
|---|---|---|---|---|
| 2005/0154578 | A1* | 7/2005 | Tong et al. | 704/5 |
| 2008/0243477 | A1* | 10/2008 | Bush | 704/8 |
| 2010/0125447 | A1* | 5/2010 | Goswami | 704/8 |

OTHER PUBLICATIONS

Yin-Ho Liu et al., "Language Identification of Character Images Using Machine Learning Techniques", [retrieved on Jun. 3, 2009]. Retrieved from the Internet: <URL: http://www.iis.sinica.edu.tw/papers/fchang/1764-F.pdf>, 5 pp.

LanguageIdentifer.com—Automatic Language Detector Software, [retrieved on Jun. 3, 2009]. Retrieved from the Internet: <URL: http://www.lextek.com/langid/li/>, 2 pp.

Kieran Snyder's webulated chit-chat, Loneliness of the long-distance linguist, "Language detection and system settings, part 1", [retrieved on Jun. 3, 2009]. Retrieved from the Internet: <URL: http://blogs.msdn.com/kierans/archive/2008/12/18/language-detection-and-system-settings-part-1-aspx>, 2 pp.

Basis Technology, Rosetta Language Identifier, "Automatically identify text in over 50 languages", © 2009 Basis Technology Corp., [retrieved on Jun. 3, 2009]. Retrieved from the Internet: <URL: http://www.basistech.com/language-identification>, 2 pp.

Abby FineReader Engine 9.0 Software Toolkit Brings New Levels of Accuracy and Performance to Multipage Document Conversion, [retrieved on Jun. 3, 2009]. Retrieved from the Internet: <URL: http://www.corrypub.com/images/email/bsm/1208/1208_DIM_ABBY.pdf>, 3 pp.

Garett Rogers, "Google's automatic language detection and translation service", Aug. 31, 2006, ZDNet, [retrieved on Jun. 3, 2009]. Retrieved from the Internet: <URL: http://blogs.zdnet.com/Google/index.php?p=312 [refers to Google LangId>, 2 pp.

Softpedia, "Language detection using character trigrams 1.1", ©2001-2009 Softpedia, [retrieved on Jun. 3, 2009]. Retrieved from the Internet: <URL: http://webscripts.softpedia.com/script/Programming-Methods-and-Algorithms-Python/Language-detection-using-character-trigrams-19451.html>, 3 pp.

Nathan Sanders, "KDE 4's Sonnet will turbocharge language processing", Feb. 7, 2007, Linux.com, [retrieved on Jun. 3, 2009]. Retrieved from the Internet: <URL: http://www.linux.com/archive/feature/59963>, 3 pp.

Sofia Bastrup et al., "Language Detection based on Unigram Analysis and Decision Trees", [retrieved on Jun. 3, 2009]. Retrieved from the Internet: <URL: http://www.cs.lth.se/EDA171/Reports/2003/sofia_christina.pdf>, 5 pp.

Dean, J., et al., "MapReduce: Simplified Data Processing on Large Clusters", OSDI 2004: Sixth Symposium on Operating System Design and Implementation, San Francisco, CA, Dec. 6, 2004, [online], [retrieved on Nov. 11, 2008]. Retrieved from the Internet: <URL: http://labs.google.com/papers/mapredace-osdi04.pdf, 13 pp.

Grefenstette, G., "Comparing Two Language Identification Schemes", JADT 1995, 3rd International Conference on Statistical Analysis of Textual Data, Rome, Dec. 11-13, 1995, 6 pages.

International Search Report and Written Opinion for PCT Application No. PCT/US2010/035413, mailed Sep. 15, 2010, 19 pages.

Pati, P., et al., "Word level multi-script identification", Pattern Recognition Letters, Elsevier B.V., Amsterdam, NL, Jul. 1, 2008, vol. 29, No. 9, pp. 1218-1229.

Sites R., "Statistical Language Detect in Web Pages", Stanford University Computer Systems Laboratory EE380 Collouium Schedule, Jan. 14, 2009, [online], [retrieved on Dec. 7, 2010]. Retrieved from the Internet: <URL: http://www.stanford.edu./class/ee380/Abstracts/090114.html>. Oral Disclosure streamed by the following link: <URL: http:www.stanford.edu/class/ee380/>, 14 pages.

Spitz, L., "Determination of the Script and Language Content of Document Images", IEEE Transactions on Pattern Analysis and Machine Intelligence, IEEE Service Center, Los Alamitos, CA, Mar. 1, 1997, vol. 19, No. 3, pp. 235-245.

\* cited by examiner $X_1\ X_2\ X_3\ X_4\ X_1\ X_2\ X_5\ X_1\ X_6$

FIG. 2B

English { hellobonjour } French

FIG. 4A

DETECTING WRITING SYSTEMS AND LANGUAGES

BACKGROUND

This specification relates to detecting writing systems and languages.

A writing system uses symbols, e.g., characters or graphemes, to represent sounds of a language. A collection of symbols in a writing system can be referred to as a script. For example, a Latin writing system, including a collection of Roman characters in one or more Roman scripts, can be used to represent the English language. A particular writing system can be used to represent more than one language. For example, the Latin writing system can also be used to represent the French language.

In addition, a given language can also be represented by more than one writing system. For example, the Chinese language can be represented by a first writing system, e.g., Pinyin (or Romanized Chinese). The Chinese language can also be represented using a second writing system, e.g., Bopomofo or Zhuyin Fuhao ("Zhuyin"). As yet another example, the Chinese language can be represented using a third writing system, e.g., Hanzi.

The complex relationship between writing systems and languages increases the difficulty of automatically detecting languages from input text. The accuracy and precision of detecting languages from input text can depend on an amount and quality of training data used to train a classifier.

SUMMARY

This specification describes technologies relating to language detection.

In general, one aspect of the subject matter described in this specification can be embodied in methods that include the actions of receiving text; identifying portions of the text as being non-repetitive, the identifying including: compressing underlying data of a first portion of the text, identifying a data compression ratio based on the amount of compression of the underlying data, and determining whether the first portion of the text is non-repetitive based on the data compression ratio; and identifying the first portion of the text as candidate text for use in language detection based on the portions of the text that are determined to be non-repetitive. Other embodiments of this aspect include corresponding systems, apparatus, and computer program products.

These and other embodiments can optionally include one or more of the following features. The compressing includes: for each first character in the first portion of the text: storing the first character in memory when the first character first occurs in the text; associating the first character with a second character when the second character occurs immediately after the first character in the text; and identifying the combination of the first character followed by the second character as repetitive when the second character is already associated with the second term. The first portion of the text is a word. The first portion of the text is a fixed-size block of the text.

In general, another aspect of the subject matter described in this specification can be embodied in methods that include the actions of detecting one or more n-grams in training data that each are associated with similar likelihoods of identifying a plurality of natural languages; generating an artificial language based on the identified n-grams; receiving text; and calculating a first likelihood that a first portion of the text represents a first natural language relative to a second likelihood that the first portion of the text represents the artificial language. Other embodiments of this aspect include corresponding systems, apparatus, and computer program products.

These and other embodiments can optionally include one or more of the following features. The method further includes determining that the first portion of the text represents the artificial language based on the second likelihood; and detecting a particular natural language that the text represents based on portions of the text outside of the first portion.

In general, another aspect of the subject matter described in this specification can be embodied in methods that include the actions of receiving text; detecting a plurality of languages represented in a portion of the text, where each of the plurality of languages are substantially similar; identifying a first likelihood that a first language in the plurality of languages represents the entire text; identifying a second likelihood that a second language in the plurality of languages represents the entire text; comparing the first likelihood to the second likelihood; and identifying that the portion of the text is represented in the first language based on the comparison. Other embodiments of this aspect include corresponding systems, apparatus, and computer program products.

These and other embodiments can optionally include one or more of the following features. The plurality of languages belong to a same language family. The plurality of languages share a common linguistic structure. The portion of the text is identified as being represented in the first language when the first likelihood is greater than the second likelihood.

In general, another aspect of the subject matter described in this specification can be embodied in methods that include the actions of receiving text; detecting a first language and a second language represented in the text by segmenting the text into n-grams of size x; determining that the first language is substantially similar to the second language; and processing the text by segmenting the text into n-grams of size y to identify a particular language that is represented in the text when the first language is substantially similar to the second language, where y>x. Other embodiments of this aspect include corresponding systems, apparatus, and computer program products.

These and other embodiments can optionally include one or more of the following features. The first language and the second language belong to a same language family. The first language and the second language share a common linguistic structure.

Particular embodiments of the subject matter described in this specification can be implemented to realize one or more of the following advantages.

The disclosed systems and techniques for language detection can be used to improve the quality of training data, e.g., by removing noisy data and accurately classifying training data as representative of a particular language, thereby increasing an accuracy, efficiency, and precision of detecting languages from input text. In particular, detecting and removing repetitive text increases types of documents (e.g., noisy documents such as web pages, blogs and emails) from which languages can be detected, thereby increasing an amount of available training data. Furthermore, detecting languages intermixed in a single document also increases the amount of available training data, as many documents contain text in two or more languages.

The systems and techniques for language detection can also be used to streamline language detection, e.g., by removing noisy data from input text, focusing analysis on particular languages of only writing systems that the input text may represent, distinguishing similar languages, and detecting precise transitions between languages used in the input text, thereby further increasing an accuracy, efficiency, and precision of detecting languages from the input text.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2B illustrates an example sequence of text including repetitive tokens.

FIG. 4A illustrates example text including a first sequence of tokens representing text in a first language followed by a second sequence of tokens representing text in a second language.

Like reference numbers and designations in the various drawings indicate like elements.

DETAILED DESCRIPTION

Statistical Language Detection Overview

Figure 1:
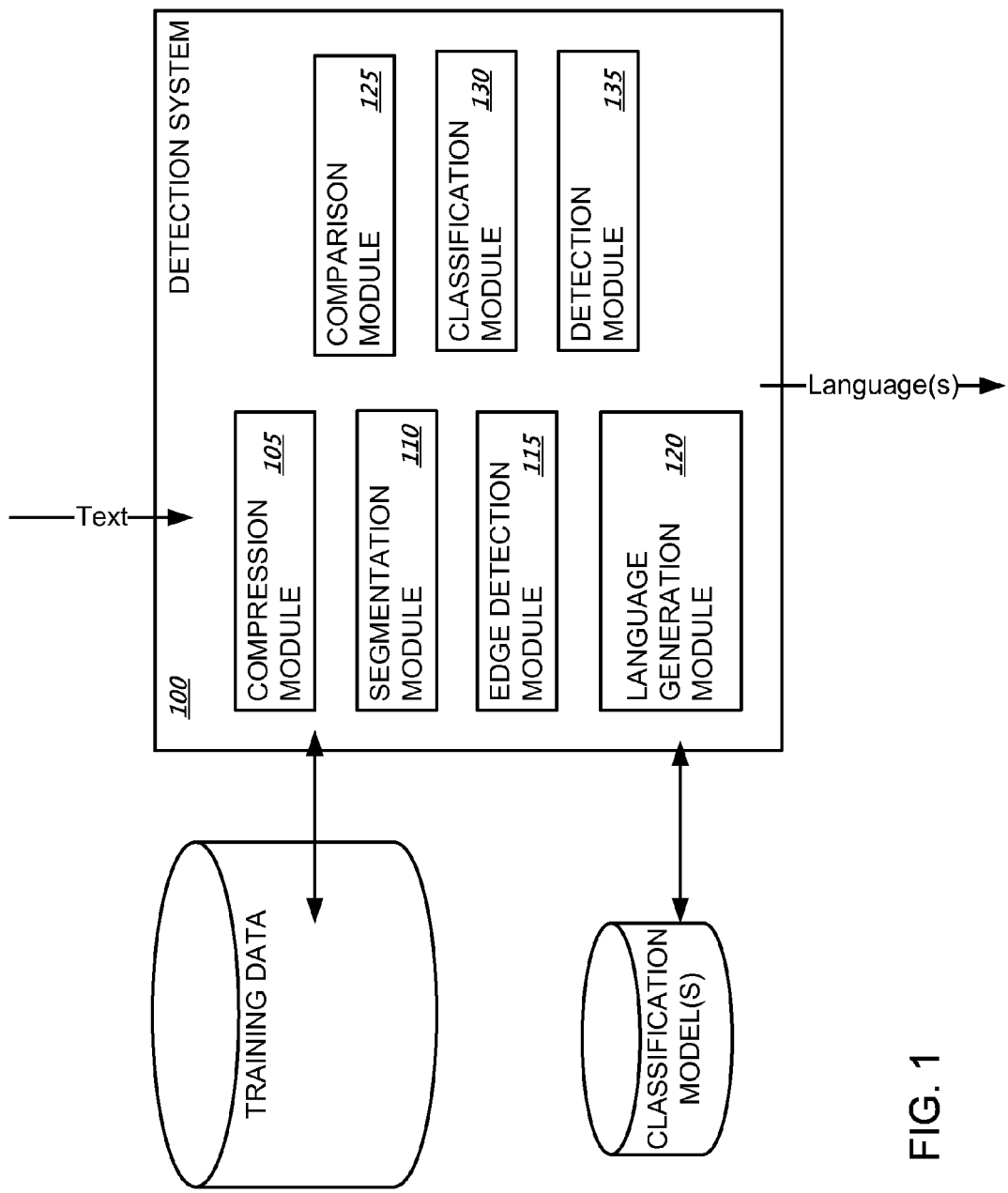
FIG. 1 includes an example detection system.

An n-gram is a sequence of n consecutive tokens, e.g., words or characters. An n-gram has an order or size, which is the number of tokens in the n-gram. For example, a 1-gram (or unigram) includes one token; a 2-gram (or bi-gram) includes two tokens.

A given n-gram can be described according to different portions of the n-gram. An n-gram can be described as a context and a future token, (context, w), where the context has a length n−1 and w represents the future token. For example, the 3-gram "$c_1 c_2 c_3$" can be described in terms of an n-gram context and a future token, where $c_1$, $c_2$, and $c_3$ each represent a character. The n-gram left context includes all tokens of the n-gram preceding the last token of the n-gram. In the given example, "$c_1 c_2$" is the context. The left most token in the context is referred to as the left token. The future token is the last token of the n-gram, which in the example is "$c_3$". The n-gram can also be described with respect to a right context. The right context includes all tokens of the n-gram following the first token of the n-gram, represented as a (n−1)-gram. In the example above, "$c_2 c_3$" is the right context.

Each n-gram can have an associated probability estimate, e.g., a log-probability, that is calculated as a function of a count of occurrences in a particular language in training data relative to a count of total occurrences in the training data. For example, a language detection system can parse training data by identifying all the 4-grams (quadgrams) in the training data. For each quadgram, a count of the number of occurrences in each particular language in the training data can be maintained and recorded. Each quadgram can also be associated with a probability estimate that indicates a likelihood that the quadgram identifies a particular language. For example, an entry for a first quadgram corresponding to en-Latn, e.g., English-Latin, can be associated with a likelihood that the first quadgram indicates English text. As another example, another entry for the first quadgram can also correspond to fr-Latn, e.g., French-Latin, and be associated with a likelihood that the first quadgram indicates French text.

In some implementations, the probabilities of n-grams identifying words in a particular language is trained using the relative frequency of the n-grams represented in the particular language in training data. Additionally, in some implementations, a distributed training environment is used for large training data (e.g., terabytes of data). One example technique for distributed training is MapReduce. Additional details of MapReduce are described in J. Dean and S. Ghemawat, *MapReduce: Simplified Data Processing on Large Clusters*, Proceedings of the 6th Symposium on Operating Systems Design and Implementation, pp. 137 150 (Dec. 6, 2004).

The n-grams, associated probability estimates, and respective counts can be stored in a classification model for use by a classifier, e.g., a Bayesian classifier, that detects languages in input text. A score indicating the likelihood that input text represents a particular language can be calculated by mapping the n-grams included in the input text to associated probability estimates for a particular language, and summing the log-likelihoods corresponding to the associated probability estimates for each n-gram.

For example, two groups of training data include a first group of French training data (e.g., a corpus of web pages, search query logs, emails, and blogs represented in the French language) and a second group of English training data. Conventional techniques can be used to process each group of training data such that the aforementioned counts and probability estimates for each n-gram can be identified and stored in a classification model, e.g., using a hash table. The probability estimates can then be used to detect languages in other text. In particular, the other text can be parsed using n-grams of a specified size. The n-grams of specified size can be compared with the entries in the classification model to determine respective probabilities. Other techniques and refinements to conventional techniques are possible, as described below.

Example Language Detection System

FIG. 1 includes an example detection system 100. Detection system 100 includes compression module 105, segmentation module 110, edge detection module 115, language generation module 120, comparison module 125, classification module 130, and detection module 135. The components of detection system 100 can be communicatively coupled to one or more of each other. Other implementations are possible. For example, classification module 130 could be a component separate from the detection system 100. Furthermore, though the components identified in detection system 100 are described as being logically separate or distinct, one or more of the components of detection system 100 may be combined or further divided.

Detection system 100 can be used to detect writing systems and languages represented in text by performing operations that include the actions described below with respect to FIGS. 2A through 6B. In some implementations, detection system 100 identifies groups of training data for particular languages that can be used to identify languages of other text. For example, the identified groups of training data can be used to train a naïve Bayesian classifier used for language detection. In some implementations, detection system 100 identifies languages in input text based on a classification model generated from specified groups of training data that represent particular languages. Other implementations are possible. For example, detection system 100 can identify the groups of training data for particular languages and use the identified groups of training data to detect languages in other input text, using conventional techniques, techniques described below, or combinations thereof.

As an overview, compression module 105 detects repetition of text that may not identify a particular language. Segmentation module 110 segments text into portions to facilitate a precise identification of particular languages represented in the portions of the text. Edge detection module 115 detects edges of scores used to identify probabilities of sequences in text being represented in particular languages to facilitate precise identification of transitions between languages in portions of the text. Language detection module 120 generates artificial languages, e.g., in the form of a classification model, to facilitate the identification of portions of text that should not be used to identify a particular language that the text represents. Comparison module 125, classification module 130, and detection module 135 can be used alone, or in conjunction with the other modules, to provide language detection. For example, comparison module 125 and classification module 130 can be used to distinguish between languages that use similar terms.

Detecting Repetitive Text

Repetitive text may be considered "noise" that skews calculated probabilities of sequences of text identifying particular languages. Therefore, it can be advantageous to remove repetitive text from training data, or from input text from which a language is to be detected.

Figure 2A:
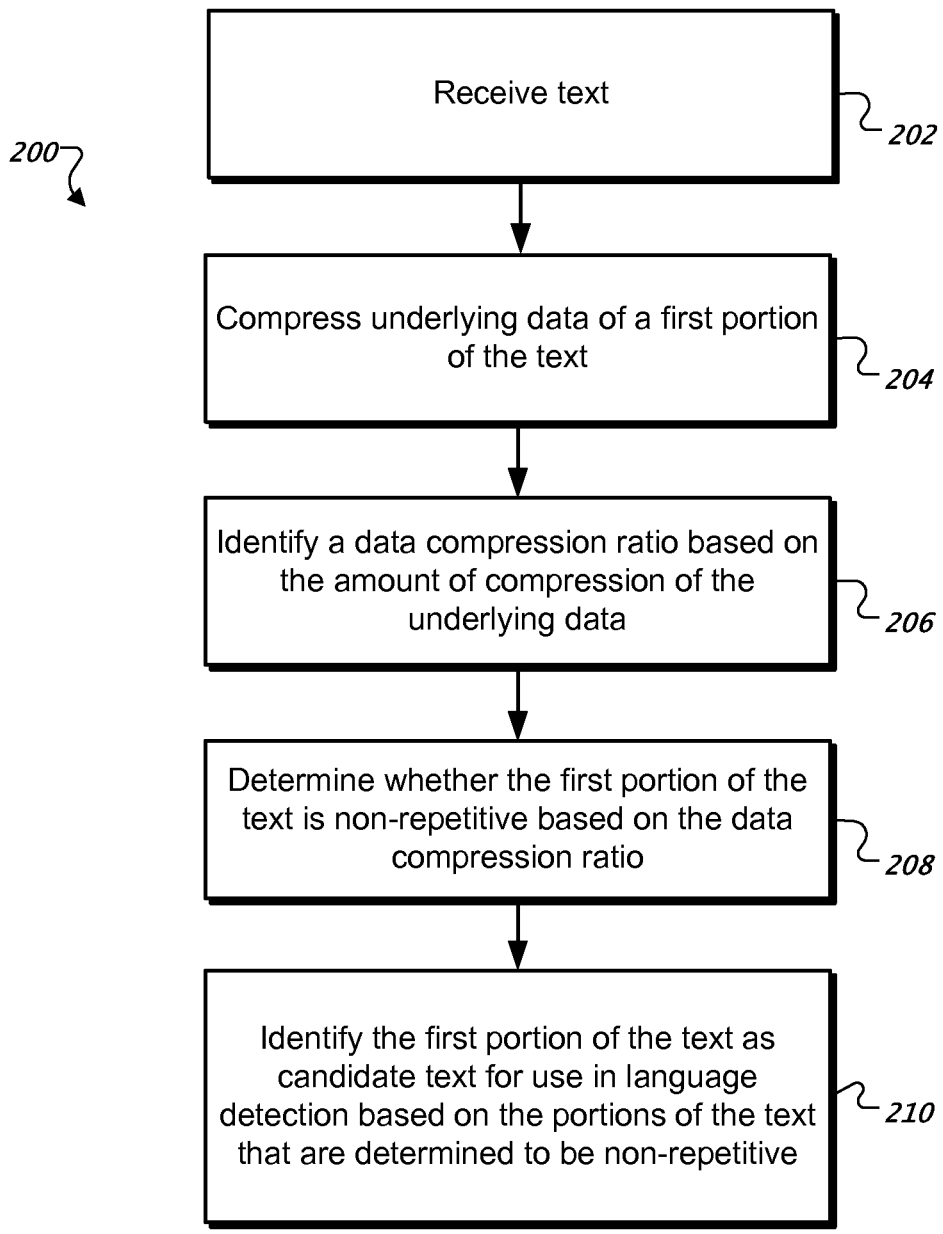
FIG. 2A shows an example process detecting repetition using compression.

FIG. 2A shows an example process 200 for detecting repetition using compression. For convenience, the compressing of text will be described with respect to a system (e.g., detection system 100 of FIG. 1) that performs the compression. The system receives text 202. The system identifies portions of the text as being non-repetitive.

In particular, the system compresses 204 underlying data of a first portion of the text. For example, compression module 105 can use a conventional compression technique to compress a portion of the input text, e.g., one or more lines or paragraphs of the input text. For example, the system can use a lossless data compression technique or a lossy data compression technique. After compressing the underlying data, the system identifies 206 a data compression ratio based on the amount of compression of the underlying data. For example, compression module 105 can identify the data compression ratio.

The system determines 208 whether or not the first portion of the text is non-repetitive based on the data compression ratio. For example, compression module 105 can compare the data compression ratio to a threshold value. Generally, text is more likely to be repetitive when the amount that the underlying data can be compressed increases. Therefore, the threshold value used can depend on the compression technique performed. For example, when a lossless data compression technique is used, the threshold value can be set to a lower value than when a lossy data compression technique is used. In some implementations, if the identified data compression ratio is lower than the threshold value, e.g., the first portion of the text could not be compressed more than an amount of compression that represents repetitive text, then the first portion of the text is determined to be non-repetitive. Similarly, if the identified data compression ratio is greater than or equal to the threshold value, then the first portion of the text is determined to be repetitive.

The system identifies 210 the first portion of the text as candidate text for use in language detection based on the portions of the text that are determined to be non-repetitive. For example, classification module 130 can identify the first portion of the text as candidate text for use in language detection if the first portion of the text is identified as non-repetitive. In some implementations, the candidate text is used as training data that can be used to generate one or more classification models for detecting languages. In some alternative implementations, the candidate text is a portion of input text for which one or more languages are detected.

In some implementations, a fixed-size block of input text, e.g., 48 bytes, is parsed using a prediction window. The prediction window can be used to perform a 12-bit hash of trigrams, for example, to predict a next token that follows the trigram. The prediction window can be shifted over each trigram, e.g., shifting one token at a time, in the text to calculate a number of correct predictions (or repetitions).

FIG. 2B illustrates an example sequence of text including repetitive tokens. The sequence of text shows the tokens "$X_1$ $X_2$ $X_3$ $X_4$ $X_1$ $X_2$ $X_5$ $X_1$ $X_6$". For example, each of the tokens can represent a character. A detection system receives the sequence of characters "$X_1$ $X_2$ $X_3$ $X_4$ $X_1$ $X_2$ $X_5$ $X_1$ $X_6$". The first character $X_1$ can be stored in memory, e.g., in a data structure such as a hash table. The detection system also associates the first character with a second character when the second character occurs immediately after the first character in the text. For example, since $X_2$ occurs immediately after $X_1$, $X_2$ can be associated with $X_1$. The detection system identifies the combination of the first character followed by the second character as repetitive when the second character is already associated with the first character, e.g., the second character is predicted by the first character. For example, the characters "$X_1$ $X_2$" repeats after the occurrence of $X_4$ and is detected as repetitive.

In some implementations, the first character, e.g., $X_1$, is associated only with the most recent character that was detected as immediately occurring after the first character. For example, $X_6$ occurs immediately after the third occurrence of $X_1$. Therefore, $X_6$ is associated with $X_1$, and $X_2$ is no longer associated with $X_1$. As a result, the next occurrence of the characters "$X_1$ $X_2$" will not be identified as repetitive. Rather, $X_1$ will be associated with $X_2$ upon the next occurrence of the characters "$X_1$ $X_2$". In other words, repetitive characters are only identified if the combination of the first character followed by the second character occurs again before the occurrence of the first character followed by a third character different from the second character.

In some implementations, a high fraction of correct predictions (e.g., 60%) over the fixed-size block of input text indicates repetitive text, and the fixed-size block of input text is removed before the system performs language detection. In further implementations, text may not appear to be repetitive, e.g., based on performing the aforementioned technique, but may be identified as represented by a particular language with low reliability. For example, the probabilities of the two most likely languages being represented by the text may be similar, or the language that is most likely represented by the text is detected as representing less than a third of the text. When the reliability is low and a high fraction of correct predictions (e.g., 50%) indicates repetitive text, the word that includes the repetitive text is removed before language detection is performed. For example, the occurrence of "$X_1 X_2$" after $X_4$ as shown in FIG. 2B, can be removed from use in language detection.

Other implementations are possible. For example, repetitive words can be removed even when the reliability is not low. In some implementations, the repetitive words are removed by deletion. In further implementations, associated probability estimates of the repetitive words are modified (e.g., lowered) using weights. For example, for removal, the associated probability estimate can be multiplied by zero. As another example, the associated probability estimate can be multiplied by a weight having a value between zero and one to reduce statistical error that may be contributed by the repetitive words, without completely removing the repetitive words.

Identifying Segments in Text

Segmenting text can be useful when detecting languages because different portions of the text can be represented in different writing systems. Furthermore, different segments of a portion in a particular writing system can be represented in different languages. For example, the text can include a first portion of text in Latin and a second portion of text in Cyrillic. The first portion of text in Latin can include segments of text representative of English and Spanish. The second portion of text in Cyrillic can include segments of text representative of Bulgarian and Russian. The likelihood of the first portion or the second portion of text including segments of text representative of Chinese is unlikely. Furthermore, the likelihood of the first portion of text including segments of text representative of Bulgarian is also unlikely. As a result, it can be advantageous to first detect writing systems that are represented in text, before detecting languages represented by the writing systems.

Figure 3:
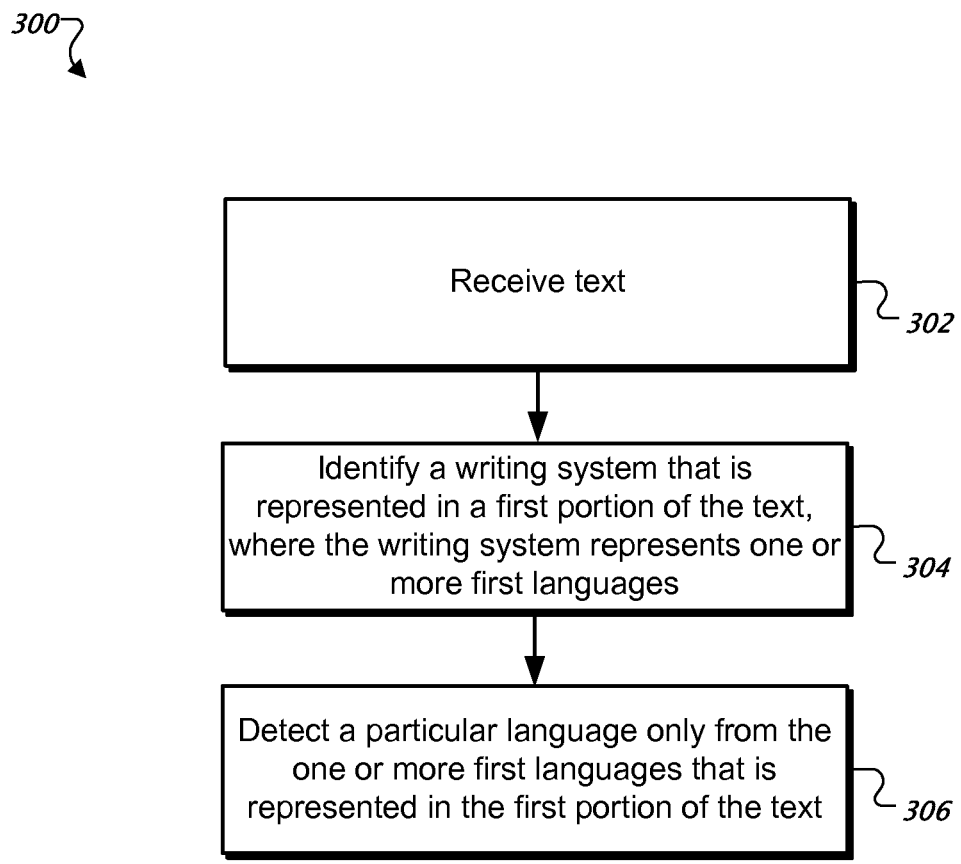
FIG. 3 shows an example process for identifying segments in text to detect writing systems and languages.

FIG. 3 shows an example process 300 for identifying segments in text to detect writing systems and languages. For convenience, the identifying of segments will be described with respect to a system (e.g., detection system 100 of FIG. 1) that performs the identification. The system receives 302 text. For example, the system can receive input text, e.g., in the form of a text document.

The system identifies 304 a writing system that is represented in a first portion of the text. The writing system represents one or more first languages. For example, the system can use conventional techniques, techniques described herein, or combinations thereof to identify the writing system. As a particular example, the writing system can be identified by detecting an encoding of the text.

As described previously, a writing system can correspond to one or more languages. The system detects 306 a particular language only from the one or more first languages that is represented in the first portion of the text. For example, the system can identify a first portion of the document, where a substantial amount of text in the first portion represents text in a first writing system. Generally, each character in input text belongs to a particular script or writing system. A lookup of the character in a character table, e.g., by mapping the character in an input encoding such as UTF-8 to a character value in a UTF-8 character table, can be performed to identify a character value and writing system. Mapping each character in this manner, contiguous portions of the input text can be identified.

Using a similar technique, the system can also identify other portions of the document, e.g., paragraphs or lines of text, as identifying other writing systems. Each identified portion that represents text in a different writing system can be processed separately to identify languages that correspond to each of the different writing systems. For example, the system can identify one or more segments in the first portion of the document, e.g., sequences of characters within the paragraphs or lines of text, where a substantial amount of text in each of one or more segments is represented in a language of the first writing system. The system can also detect a particular language of the first writing system that is represented by a substantial amount of text in the one or more segments. For example, the system may identify that a first paragraph in a document is represented in Latin. The system may then detect that part of the first paragraph is English and another part of the first paragraph is French.

Other implementations are possible. In some implementations, two or more writing systems are treated as a single writing system. For example, the writing systems that represent Chinese, Japanese, and Korean (CJK) can be combined and treated as a single writing system, e.g., a merged writing system, for purposes of language detection. Using a merged writing system can be advantageous when two or more languages use characters from a same writing system. In particular, the Chinese, Japanese, and Korean languages each use Han characters (Chinese characters). If Japanese text were segmented into Han portions, Katakana portions, and Hiragana portions, the Han portions may be mis-identified as representing Chinese rather than Japanese. Combining the portions, e.g., by using a merged writing system for CJK, allows context from the Katakana and Hiragana text to be considered when identifying the intermixed Han characters, and ideally results in the identification of Japanese.

Detecting Edges

Another technique for refining language detection involves detecting edges that indicate a transition from one language to another language in text. In particular, variations between scores can be detected to identify the transition.

Figure 4A:
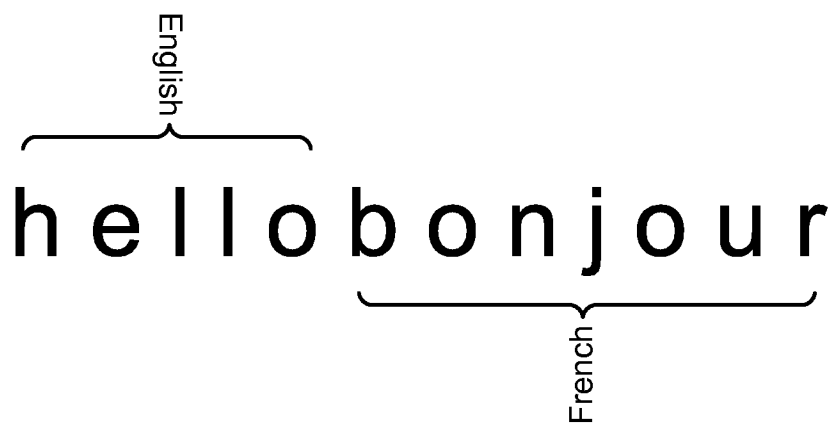

FIG. 4A illustrates example text including a first sequence of tokens representing text in a first language followed by a second sequence of tokens representing text in a second language. In particular, the text "hello bonjour" includes the English word "hello" followed by the French word "bonjour" (e.g., "hello" in English). The text can be represented as the sequence of tokens "h e l l o b o n j o u r". Scores can be calculated for n-grams in the sequence of tokens to identify one or more languages represented in the text.

Figure 4B:
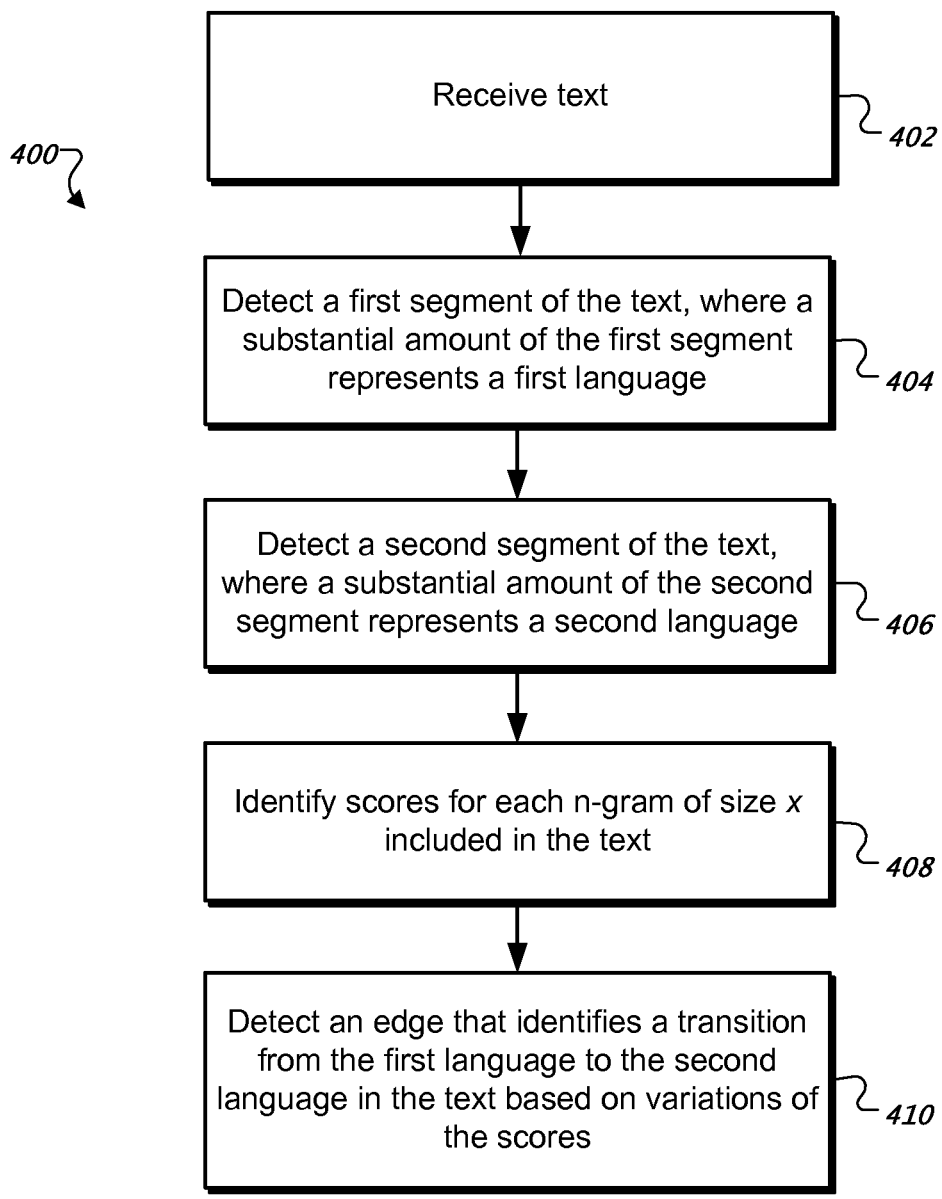
FIG. 4B shows an example process for detecting edges between different languages represented in text.

FIG. 4B shows an example process 400 for detecting edges between different languages represented in text. For convenience, the detecting of edges will be described with respect to a system (e.g., detection system 100 of FIG. 1) that performs the detection. The system receives 402 text. The system detects 404 a first segment of the text, where a substantial amount of the first segment represents a first language. The system detects 406 a second segment of the text, where a substantial amount of the second segment represents a second language. For example, the system can detect a first segment of the text as representing a first language, and a second segment of the text as representing a second language based on techniques described above with respect to FIGS. 1 through 4B. For illustrative purposes only, a system may initially identify "hello bon" as text in English and "jour" (e.g., "day" in English) in French.

The system identifies 408 scores for each n-gram of size x included in the text. As shown in FIG. 4A, for example, scores can be calculated for n-grams of size 4 (quadgrams). In the example, the quadgrams include "hell", "ello", "llob", "lobo", "obon", "bonj", "onjo", "njou", and "jour".

In some implementations, a first score for each of the quadgrams indicating the probability that the quadgram represents English is calculated. In addition, a second score for each of the quadgrams indicating the probability that the quadgram represents French is identified. For example, a first score A indicating the probability that "hell" represents English can be identified. In addition, a second score B indicating the probability that "hell" represents French can be identified. The second score can be subtracted from the first score, e.g., A-B, to produce an intermediate score for "hell". An intermediate score can be calculated for each of the quadgrams in a similar manner. In some implementations, quadgrams that are more likely to represent English than French have a positive intermediate score, and quadgrams that are more likely to represent French than English have a negative intermediate score.

Intermediate scores for single n-grams generally include noise, which can be removed by averaging across multiple intermediate scores. The averaging smoothes the data such that a most likely boundary indicating a transition between two languages is identified. As such, in further implementations, an average of a specified number of intermediate scores for quadgrams that occur in sequence in the text is calculated. For example, if the specified number is four, the average of the intermediate scores for "hell", "ello", "llob", and "lobo" is calculated. In the example, average of intermediate scores for six groups of quadgrams including: (1) "hell", "ello", "llob", and "lobo"; (2) "ello", "llob", "lobo", "obon"; (3) "llob", "lobo", "obon", "bonj"; (4) "lobo", "obon", "bonj", "onjo"; (5) "obon", "bonj", "onjo", "njou"; and (6) "bonj", "onjo", "njou", and "jour", are calculated. The difference between each pair of intermediate scores for two groups of quadgrams that occur sequentially in the text can be calculated. In particular, differences between intermediate scores can be calculated for groups (1) and (2), (2) and (3), (3) and (4), (4) and (5), and (5) and (6).

The system detects 410 an edge that identifies a transition from the first language to the second language in the text based on variations of the scores. For example, a maximum difference between scores can be used to detect the edge. Ideally, the maximum difference between intermediate scores would correspond to groups (5) and (6), identifying that the edge exists between "hello" and "bonjour". Other implementations are possible. For example, the edge can be identified based on a maximum variation between the average of only first scores for the six groups of quadgrams.

Artificial Language

Unlike text found in sources such as literature or newspapers, text from web pages may not provide a useful indication of what natural languages (e.g., languages spoken by humans) are represented in the text. Such text should not be used, at least in its entirety, as training data for training a classifier to detect languages. For example, "Copyright 2008" occurs on web pages written in languages other than English. Therefore, the word "Copyright" would not be a useful indicator for detecting languages. Similarly, the sequence of characters "jpg" (e.g., representing an extension for an image file format) occurs frequently in text and also does not provide a useful indication for detecting languages. In practice, "Copyright" and "jpg" may be identified as belonging to a particular natural language, which may not be English, thereby skewing the language detection results. An artificial language that includes these types of n-grams can be generated so that the n-grams do not contribute statistical error when detecting languages in the text.

Figure 5:
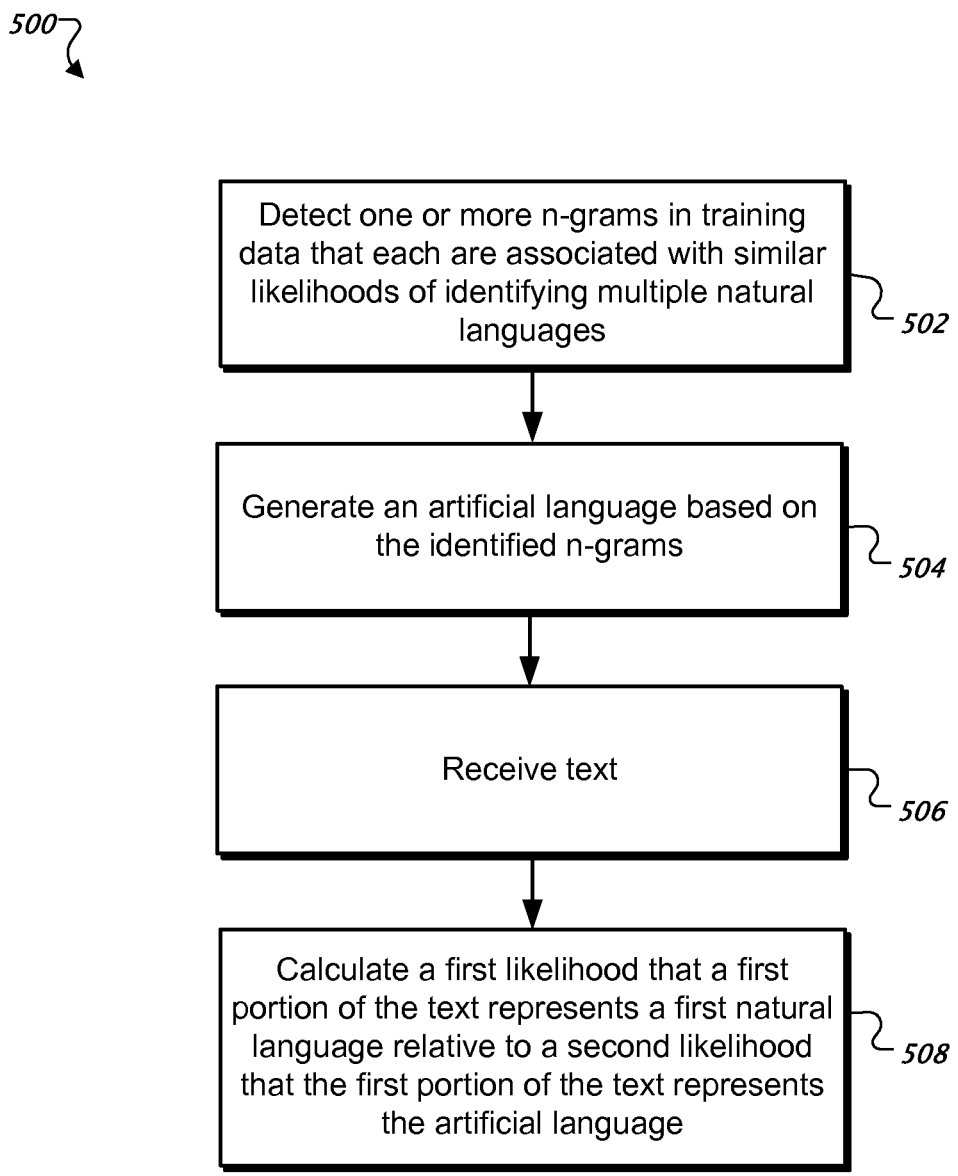
FIG. 5 shows an example process for generating an artificial language and detecting languages using the artificial language.

FIG. 5 shows an example process 500 for generating an artificial language and detecting languages using the artificial language. For convenience, the generating and detecting will be described with respect to a system (e.g., detection system 100 of FIG. 1) that performs the generation and detection. The system detects 502 one or more n-grams in training data that each are associated with similar likelihoods of identifying multiple natural languages. For example, the system can score the n-grams, using conventional techniques, techniques described herein, or combinations thereof, and identify one or more of the n-grams that have substantially similar likelihoods of identifying two or more natural languages, e.g., languages spoken by humans.

The system generates 504 an artificial language based on the identified n-grams. For example, the system can generate a classification model for the artificial language that includes the identified n-grams, associated probability estimates that the n-grams represent the artificial language, and respective counts.

In some implementations, the artificial language is treated, like a natural language, as a language that is potentially represented by input text. For example, text can be received. The system can detect whether or not the received text includes text representative of the artificial language or other natural languages. In particular, the system receives 506 text and calculates 508 a first likelihood that the received text represents a first natural language relative to a second likelihood that the received text represents the artificial language. For example, the system may detect a 30% likelihood that the received text represents English, a 40% likelihood that the received text represents French, and a 30% likelihood that the received text represents an artificial language.

The likelihood that the received text represents the artificial language can be compared to the likelihood that the received text represents English, for example, to identify a confidence value that represents a likelihood that the received text represents English relative to French or other natural languages.

In some implementations, the received text identified as representing artificial language can be removed from the received text to produce modified text. As described previously, removal can be performed by deletion or by modifying associated probability estimates using weights (e.g., a zero weight). As a result, the system detects new likelihoods of the modified text representing natural languages. For example, on a second pass of the modified text, the system may detect a 60% likelihood of English and a 40% likelihood of French.

Similar Languages

Figure 6A:
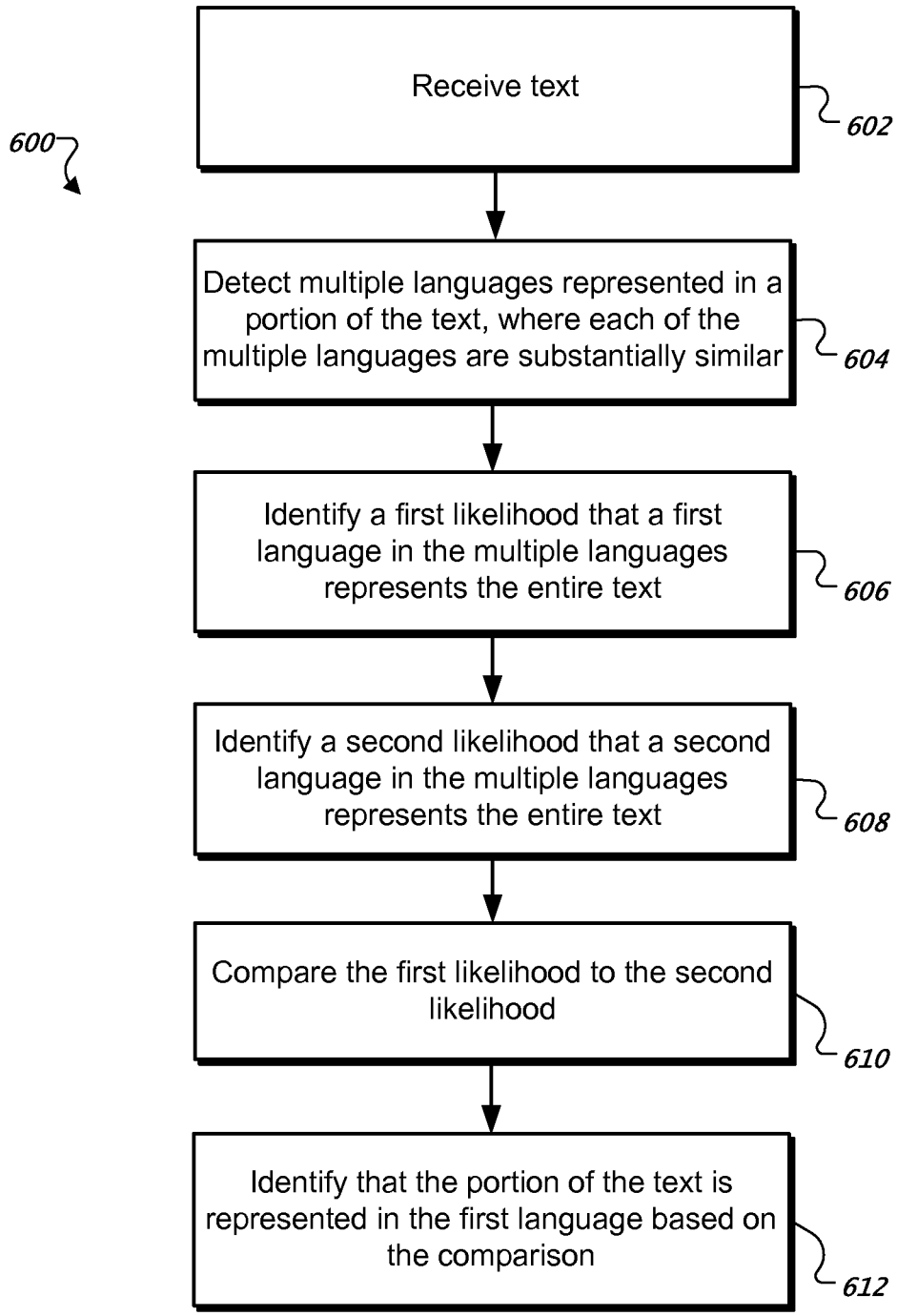
FIG. 6A illustrates an example sequence of text that includes terms from similar languages.

FIG. 6A illustrates an example process 600 for distinguishing between similar languages. For convenience, distinguishing between similar languages will be described with respect to a system that performs the distinguishing. The system (e.g., detection system 100) receives 602 text. The system detects 604 multiple languages represented in a portion of the text, where each of the multiple languages are substantially similar. For example, the system can detect multiple languages (e.g., similar languages such as Malaysian and Indonesian) represented in the portion of text using conventional techniques, techniques described previously, or combinations thereof. Languages can be considered substantially similar to each other when they belong to a same language family, for example, or if they share a common linguistic structure. Other examples of similar languages include Czech and Slovak.

In some implementations, similar languages can be identified by identifying particular n-grams that occur frequently in two or more languages, where the particular n-grams have substantially similar likelihoods of representing the two or more languages.

The system identifies 606 a first likelihood that a first language in the multiple languages represents the entire text. For example, the system can identify a first likelihood that Malaysian represents the entire text. The system identifies 608 a second likelihood that a second language in the multiple languages represents the entire text. For example, the system can identify a second likelihood that Indonesian represents the entire text. The system compares 610 the first likelihood to the second likelihood. For example, the system can compare the likelihood that Malaysian represents the entire text to the likelihood that Indonesian represents the entire text.

The system identifies 612 that the portion of the text is represented in the first language based on the comparison. For example, if the likelihood that Malaysian represents the entire text is greater than the likelihood that Indonesian represents the entire text, the system can identify that the portion of the text is represented in Malaysian. Other implementations are possible. For example, the first likelihood and second likelihood can be identified based on less than the entire text, e.g., based on another portion of text that is larger than the portion of text from which the multiple languages were initially detected.

Furthermore, although languages may be similar, differences between similar languages can be more easily identified, in some implementations, by processing a larger number of tokens (e.g., 8 tokens) at one time. Although processing a larger number of tokens at one time can be performed for all languages, performing this processing for only similar languages can increase an efficiency of language detection, as many languages may be distinguished through processing with a smaller number of tokens (e.g., 4 tokens).

For example, similar languages may be detected as potentially representing a sequence of text based on an examination of n-grams of size x. Increasing the size of the n-grams to a size y>x examined increases the likelihood that the n-gram will map to one or more complete words in a language, thereby increasing the likelihood of distinguishing one similar language from another. For example, "keuangan" has a high probability of being Indonesian, "kewangan" has a high probability of being Malaysian, but "keua", "uang", "ngan", "kewa", "wang", and "ngan" have similar probabilities of being Indonesian or Malaysian.

Figure 6B:
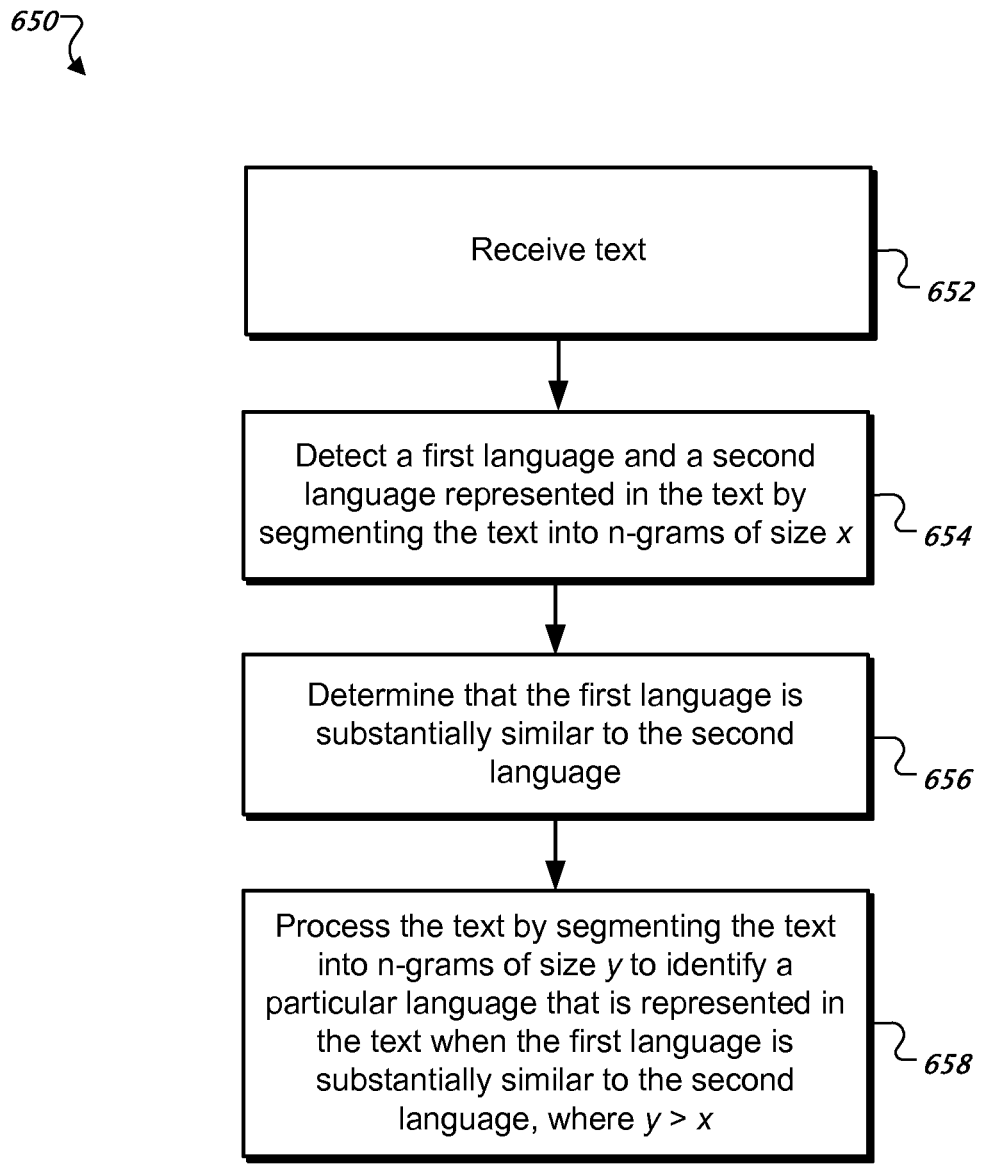
FIG. 6B illustrates an example process for distinguishing between similar languages.

FIG. 6B illustrates another example process 650 for distinguishing between similar languages. For convenience, distinguishing between similar languages will be described with respect to a system that performs the distinguishing. The system (e.g., detection system 100) receives 652 text. The system detects 654 a first language and a second language represented in the text by segmenting the text into n-grams of size x. For example, the system parses the text using n-grams of size x, e.g., size 4.

The system determines 656 that the first language is substantially similar to the second language. When the first language is substantially similar to the second language, the system processes 658 the text by segmenting the text into n-grams of size y to identify a particular language that is represented in the text based on identifying that the first language is substantially similar to the second language, where y>x. For example, the system parses the text using n-grams of size y, e.g., size 8.

Other implementations are possible. For example, the size of n-grams can be reduced, e.g., when the system consistently identifies only one language over a large amount of training data, e.g., millions of web pages.

The techniques described previously can also be performed offline, during run-time, e.g., in real-time in response to receiving input text, or in combinations thereof. An example of performing the techniques offline includes generating training data for use in the identification of languages represented in input text. An example of performing the techniques during run-time includes compressing the input text to remove repetitive portions, segmenting the remaining portions, and identifying languages in the segmented portions based on detected edges. Other implementations are possible.

Figure 7:
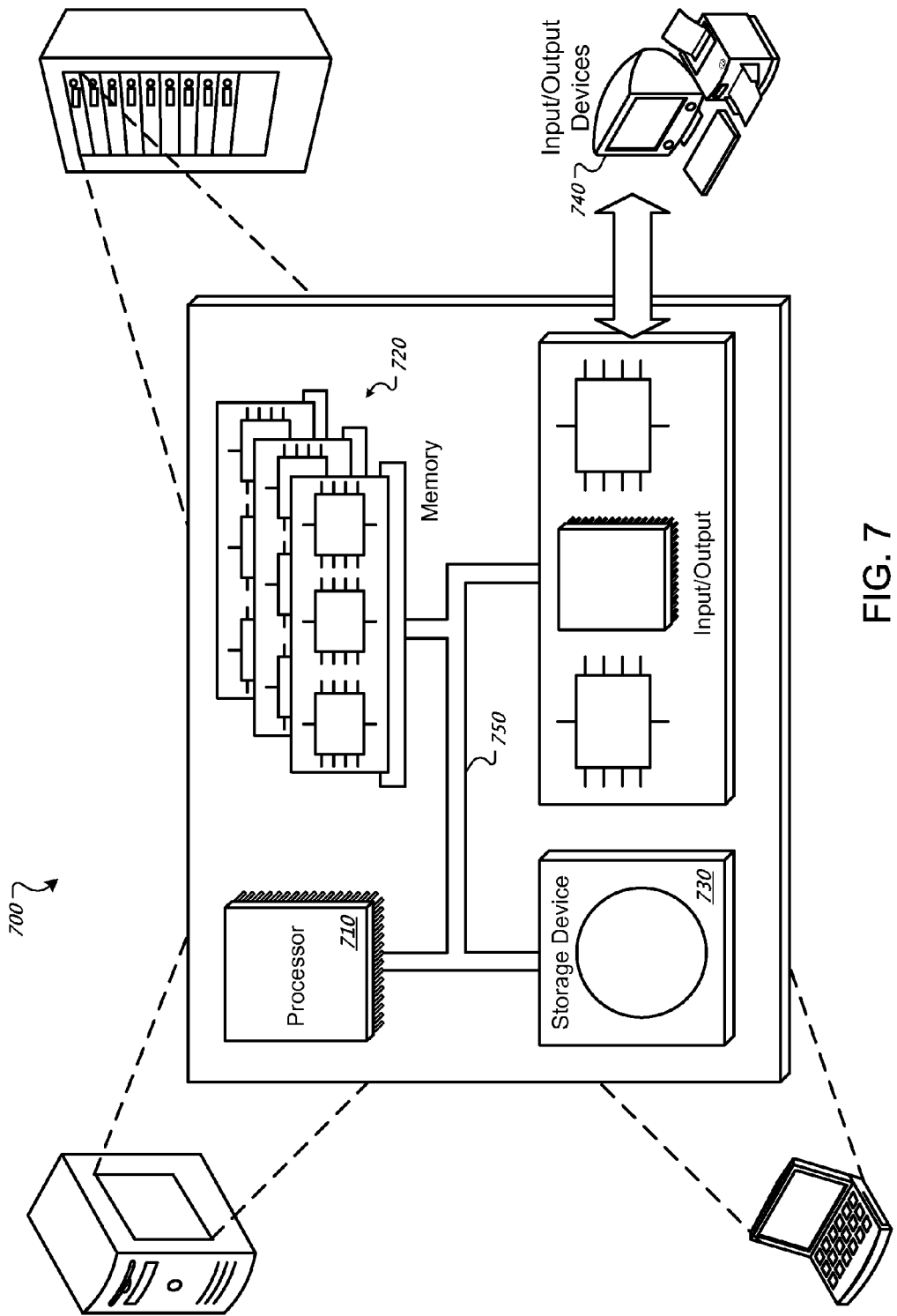
FIG. 7 is a schematic diagram of a generic computer system.

FIG. 7 is a schematic diagram of a generic computer system 700. The system 700 can be used for practicing operations described in association with the techniques described previously (e.g., processes 200, 220, 300, 400, 500, 600, and 650). The system 700 can include a processor 710, a memory 720, a storage device 730, and input/output devices 740. Each of the components 710, 720, 730, and 740 are interconnected using a system bus 750. The processor 710 is capable of processing instructions for execution within the system 700. Such executed instructions can implement one or more components of a system, for detecting languages as described with respect to FIGS. 1 through 6B, for example. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 is a computer readable medium including, for example, volatile or non-volatile that stores information within the system 700. The memory 720 could store the classification models, for example. The storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In one implementation, the input/output device 740 includes a keyboard and/or pointing device. In another implementation, the input/output device 740 includes a display unit for displaying graphical user interfaces.

The input/output device 740 can provide input/output operations for a system, e.g., detection system 100 of FIG. 1. Detection system 100 can include computer software components that implement modules 105, 110, 115, 120, 125, and 130, for example. Such software components can be persisted in storage device 730, memory 720 or can be obtained over a network connection, to name a few examples.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving text at a computer system having at least one processor;
detecting, at the computer system, a first language and a second language represented in the text by segmenting the text into n-grams of size x;
determining, at the computer system, whether the first language is substantially similar to the second language;
when the first language is substantially similar to the second language, processing, at the computer system, the text by segmenting the text into n-grams of size y to identify a particular language that is represented in the text, where y>x; and
when the first language is not substantially similar to the second language, identifying the particular language that is represented in the text based on the segmenting the text into n-grams of size x.

2. The method of claim 1, where the first language and the second language belong to a same language family.

3. The method of claim 1, where the first language and the second language share a common linguistic structure.

4. A computer program product, encoded on a tangible, non-transitory computer readable storage medium, operable to cause data processing apparatus to perform operations comprising:
receiving text;
detecting a first language and a second language represented in the text by segmenting the text into n-grams of size x;
determining whether the first language is substantially similar to the second language;
when the first language is substantially similar to the second language, processing the text by segmenting the text into n-grams of size y to identify a particular language that is represented in the text, where y>x; and
when the first language is not substantially similar to the second language, identifying the particular language that is represented in the text based on the segmenting the text into n-grams of size x.

5. A system, comprising:
a machine-readable storage device including a program product; and
one or more computers operable to execute the program product and perform operations comprising:
receiving text;
detecting a first language and a second language represented in the text by segmenting the text into n-grams of size x;
determining whether the first language is substantially similar to the second language;
when the first language is substantially similar to the second language, processing the text by segmenting the text into n-grams of size y to identify a particular language that is represented in the text, where y>x; and
when the first language is not substantially similar to the second language, identifying the particular language that is represented in the text based on the segmenting the text into n-grams of size x.

\* \* \* \* \*